United States Patent
Yan et al.

(10) Patent No.: US 10,387,773 B2
(45) Date of Patent: Aug. 20, 2019

(54) HIERARCHICAL DEEP CONVOLUTIONAL NEURAL NETWORK FOR IMAGE CLASSIFICATION

(71) Applicant: eBay Inc., San Jose, CA (US)

(72) Inventors: Zhicheng Yan, Champaign, IL (US); Robinson Piramuthu, Oakland, CA (US); Vignesh Jagadeesh, Santa Clara, CA (US); Wei Di, San Jose, CA (US); Dennis Decoste, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 569 days.

(21) Appl. No.: 14/582,059

(22) Filed: Dec. 23, 2014

(65) Prior Publication Data

US 2016/0117587 A1    Apr. 28, 2016

Related U.S. Application Data

(60) Provisional application No. 62/068,883, filed on Oct. 27, 2014.

(51) Int. Cl.
*G06N 3/08* (2006.01)
*G06N 3/04* (2006.01)

(52) U.S. Cl.
CPC .......... *G06N 3/08* (2013.01); *G06N 3/04* (2013.01); *G06N 3/0454* (2013.01); *G06N 3/084* (2013.01)

(58) Field of Classification Search
None
See application file for complete search history.

(56) References Cited

U.S. PATENT DOCUMENTS

| 6,324,532 | B1 |  | 11/2001 | Spence et al. |
| 9,530,047 | B1 | * | 12/2016 | Tang ............... G06K 9/00288 |
| 9,530,071 | B2 | * | 12/2016 | Yin ................. G06K 9/00228 |
| 2006/0217968 | A1 |  | 9/2006 | Burges et al. |
| 2014/0307076 | A1 |  | 10/2014 | Deutsch |

FOREIGN PATENT DOCUMENTS

| CN | 107077625 A | 8/2017 |
| WO | 2016069581 | 5/2016 |

OTHER PUBLICATIONS

Frey, Brendan J., and Delbert Dueck. "Clustering by passing messages between data points." science 315.5814 (2007): 972-976.*

(Continued)

*Primary Examiner* — Li B. Zhen
*Assistant Examiner* — Daniel T Pellett
(74) *Attorney, Agent, or Firm* — Schwegman Lundberg & Woessner, P.A.

(57) ABSTRACT

Hierarchical branching deep convolutional neural networks (HD-CNNs) improve existing convolutional neural network (CNN) technology. In a HD-CNN, classes that can be easily distinguished are classified in a higher layer coarse category CNN, while the most difficult classifications are done on lower layer fine category CNNs. Multinomial logistic loss and a novel temporal sparsity penalty may be used in HD-CNN training. The use of multinomial logistic loss and a temporal sparsity penalty causes each branching component to deal with distinct subsets of categories.

20 Claims, 9 Drawing Sheets
(1 of 9 Drawing Sheet(s) Filed in Color)

(56) References Cited

OTHER PUBLICATIONS

Turaga, Srinivas C., et al. "Convolutional networks can learn to generate affinity graphs for image segmentation." Neural computation 22.2 (2010): 511-538.*
Socher, Richard, et al. "Convolutional-Recursive Deep Learning for 3D Object Classification." NIPS. vol. 3. No. 7. 2012.*
Zhou, Erjin, et al. "Extensive facial landmark localization with coarse-to-fine convolutional network cascade." Proceedings of the IEEE International Conference on Computer Vision Workshops. 2013.*
Krizhevsky, Alex, Ilya Sutskever, and Geoffrey E. Hinton. "Imagenet classification with deep convolutional neural networks." Advances in neural information processing systems. 2012.*
Belkin, Mikhail, and Partha Niyogi. "Laplacian eigenmaps for dimensionality reduction and data representation." Neural computation 15.6 (2003): 1373-1396.*
Krizhevsky, Alex, and Geoffrey Hinton. "Learning multiple layers of features from tiny images." (2009).*
Sermanet, Pierre, et al. "Overfeat: Integrated recognition, localization and detection using convolutional networks." arXiv preprint arXiv:1312.6229(2013).*
Lee, Honglak, Chaitanya Ekanadham, and Andrew Y. Ng. "Sparse deep belief net model for visual area V2." Advances in neural information processing systems. 2008.*
Bai, Jing, et al. "Subset based deep learning for RGB-D object recognition."Neurocomputing 165 (2015): 280-292.*
Bharathi, P T, et al., "Optimization of image processing techniques using Neural Networks—A Review", WSEAS Transactions on Information Science and Applications, Issue 8, vol. 8, (Aug. 2011), 300-328.
Bo, Liefeng, et al., "Hierarchical Matching Pursuit for Image Classification: Architecture and Fast Algorithms", NIPS, (2011), 1527-1554.
Coates, Adam, et al., "An Analysis of Single-Layer Networks in Unsupervised Feature Learning", Proceedings of the 14th International Conference on Artificial Intelligence and Statistics, vol. 15 of JMLR: W&CP 15., (2011), 215-223.
Fahlman, Scott, et al., "The Cascade-Correlation Learning Architecture", CMU-CS-90-100. School of Computer Science Carnegie Mellon University, (Aug. 29, 1991), 1-13.
Krizhevsky, Alex, "Learning Multiple Layers of Features from Tiny Images. Master's thesis, Department of Computer Science, University of Toronto", (Apr. 8, 2009), 1-60.
"European Application Serial No. 15854092.2 Response to Communication pursuant to Rules 161(2) and 162 EPC dated Jun. 21, 2017", 17 pgs.
"International Application Serial No. PCT/US2015/057557, International Preliminary Report on Patentability dated May 11, 2017", 7 pgs.
"International Application Serial No. PCT/US2015/057557, International Search Report dated Jan. 27, 2016", 2 pgs.
"International Application Serial No. PCT/US2015/057557, Written Opinion dated Jan. 27, 2016", 5 pgs.
Yan, et al., "HD-CNN: Hierarchical Deep Convolutional Neural Network for Image Classification", ARXIV, Online Retrieved From the Internet: [Retrieved Dec. 16, 2015 (Dec. 16, 2015) from Google Web at http://arxiv.org/pdf/1410.0736v1.pdf) [ArXiv ID# 1410.0736v1], (Oct. 3, 2014), 8 pgs.
Extended European Search Report received for European Patent Application No. 15854092.2, dated Apr. 20, 2018, 10 pages.
Wang, et al.,"Learning Fine-Grained Image Similarity with Deep Ranking", Retrieved from the internet URL< https://users.eecs.northwestern.edu/~jwa368/pdfs/deep_ranking.pdf>,2014, pp. 1386-1393.
Notice of Reasons for Rejection received for Japanese Patent Application No. 2017-522329, dated Jun. 19, 2018, 8 pages (w/English Translation).
"Japanese Application Serial No. 2017-522329, Response filed Sep. 14, 2018 to Office Action dated Jun. 19, 2018", w English Claims, 12 pages.(5 pages of English Pending Claims and 7 pages of Official Copy).
"Korean Application Serial No. 10-2017-7014256, Notice of Preliminary Rejection dated Dec. 13, 2018", 11 pgs, English portions only.
Yan, Zhicheng, "HD CNN Hierarchical Deep Convolutional Neural Networks for Large Scale Visual Recognition", (Oct. 3, 2014), 9 pages.

* cited by examiner

HIERARCHICAL DEEP CONVOLUTIONAL NEURAL NETWORK FOR IMAGE CLASSIFICATION

PRIORITY CLAIM

The application claims priority to U.S. Patent Application No. 62/068,883, filed Oct. 27, 2014, entitled "Hierarchical Deep Convolutional Neural Network For Image Classification," which application is incorporated herein by reference in its entirety.

TECHNICAL FIELD

The subject matter disclosed herein generally relates to the use of hierarchical deep convolutional neural networks for classifying data. Specifically, the present disclosure addresses systems and methods related to the generation and use of hierarchical deep convolutional neural networks for classifying images.

BACKGROUND

A deep convolutional neural network (CNN) is trained as an N-way classifier to distinguish between N classes of data. CNN classifiers are used to classify images, detect objects, estimate poses, recognize faces, and perform other classification tasks. Typically, the structure of the CNN (e.g., number of layers, types of layers, connectivity between layers, and so on) is selected by the designer, and then the parameters of each layer are determined by training.

Multiple classifiers can be used in combination by averaging. In model averaging, multiple separate models are used. Each model is capable of classifying the full set of the categories and each one is trained independently. The main sources of their prediction differences include different initializations, different subsets of a global training set, and so on. The output of the combined models is the average output of the separate models.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated, by way of example and not limitation, in the figures of the accompanying drawings.

DETAILED DESCRIPTION

Example methods and systems are directed to hierarchical deep CNNs for image classification. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A hierarchical deep CNN (HD-CNN) follows the coarse-to-fine classification strategy and modular design principle. For any given class label, it is possible to define a set of easy classes and a set of confusing classes. Accordingly, an initial coarse classifier CNN can separate the easily separable classes from one another. Subsequently, the challenging classes are routed to downstream fine CNNs that focus solely on confusing classes. In some example embodiments, HD-CNN improves classification performance over standard deep CNN models. As with a CNN, the structure of an HD-CNN (e.g., the structure of each component CNN, the number of fine classes, and so on) may be determined by a designer, while the parameters of each layer of each CNN may be determined through training.

Pretraining an HD-CNN can achieve benefits over training the HD-CNN from scratch. For example, compared with the standard deep CNN model, an HD-CNN has additional free parameters from shared branching shallow layers as well as C' independent branching deep layers. This will greatly increase the number of free parameters within a HD-CNN relative to a standard CNN. Accordingly, if the same amount of training data is used, overfitting is more likely to occur in the HD-CNN. Pretraining can help overcome the difficulty of insufficient training data.

Another potential benefit of pretraining is that a good selection of coarse categories will be beneficial for training the branching components to focus on a consistent subset of fine categories that are easily confused. For example, the branching component 1 excels in telling Apple from Orange while the branching component 2 is more capable of telling Bus from Train. Accordingly, a set of coarse categories are identified which the coarse category component is pretrained to classify.

Some training datasets include information about coarse categories and the relationships between the fine categories and the coarse categories. Many training datasets, however, do not. These training datasets merely provide the fine category for each item in the dataset, without identifying coarse categories. Accordingly, a procedure for dividing the fine categories into coarse categories is described below with respect to FIG. 6.

Figure 1:
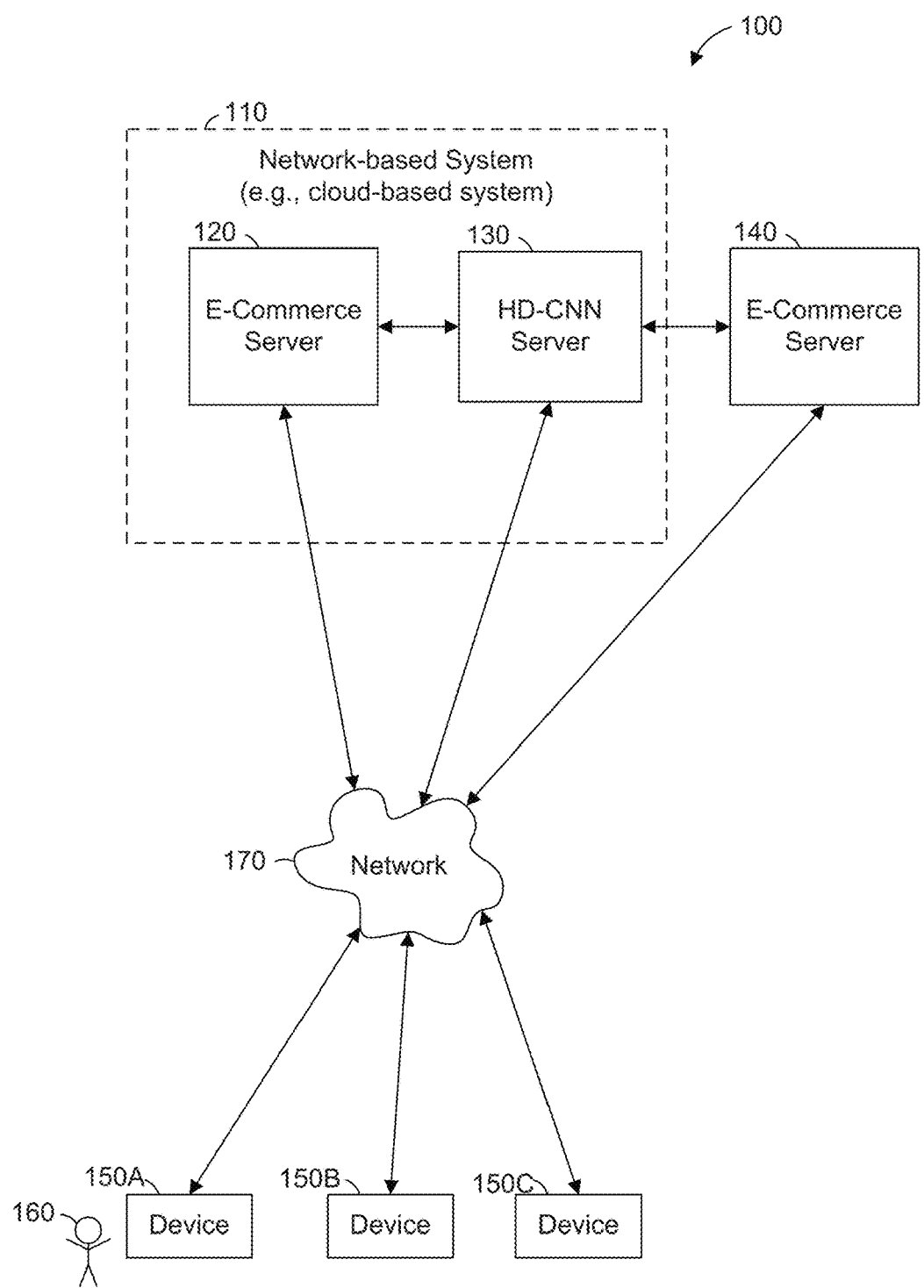
FIG. 1 is a network diagram illustrating a network environment suitable for creating and using hierarchical deep CNNs for image classification, according to some example embodiments.

FIG. 1 is a network diagram illustrating a network environment 100 suitable for creating and using hierarchical deep CNNs for image classification, according to some example embodiments. The network environment 100 includes e-commerce servers 120 and 140, an HD-CNN server 130, and devices 150A, 150B, and 150C, all communicatively coupled to each other via a network 170. The devices 150A, 150B, and 150C may be collectively referred to as "devices 150," or generically referred to as a "device 150." The e-commerce servers 120 and 140 and the HD-CNN server 130 may be part of a network-based system 110. Alternatively, the devices 150 may connect to the HD-CNN server 130 directly or over a local network distinct from the network 170 used to connect to the e-commerce server 120 or 140. The e-commerce servers 120 and 140, the HD-CNN server 130, and the devices 150 may each be implemented in a computer system, in whole or in part, as described below with respect to FIGS. 8-9.

The e-commerce servers 120 and 140 provide an electronic commerce application to other machines (e.g., the devices 150) via the network 170. The e-commerce servers 120 and 140 may also be connected directly to, or integrated with, the HD-CNN server 130. In some example embodiments, one e-commerce server 120 and the HD-CNN server 130 are part of a network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

The HD-CNN server 130 creates an HD-CNN for classifying images, uses an HD-CNN to classify images, or both. For example, the HD-CNN server 130 can create an HD-CNN for classifying images based on a training set or a preexisting HD-CNN can be loaded onto the HD-CNN server 130. The HD-CNN server 130 can also respond to requests for classification of images by providing a fine category for the image. The HD-CNN server 130 may provide data to other machines (e.g., the e-commerce servers 120 and 140 or the devices 150) via the network 170 or another network. The HD-CNN server 130 may receive data from other machines (e.g., the e-commerce servers 120 and 140 or the devices 150) via the network 170 or another network. In some example embodiments, the functions of the HD-CNN server 130 described herein are performed on a user device, such as a personal computer, tablet computer, or smart phone.

Also shown in FIG. 1 is a user 160. The user 160 may be a human user (e.g., a human being), a machine user (e.g., a computer configured by a software program to interact with the devices 150 and the HD-CNN server 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the HD-CNN server 130 receives data regarding an item of interest to a user. For example, a camera attached to the device 150A can take an image of an item the user 160 wishes to sell and transmit the image over the network 170 to the HD-CNN server 130. The HD-CNN server 130 categorizes the item based on the image. The category can be sent to e-commerce server 120 or 140, to the device 150A, or any combination thereof. The category can be used by the e-commerce server 120 or 140 to aid in generating a listing of the item for sale. Similarly, the image may be of an item of interest to the user 160, and the category can be used by the e-commerce server 120 or 140 to aid in selecting listings of items to show to the user 160.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 8-9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 170 may be any network that enables communication between or among machines, databases, and devices (e.g., the HD-CNN server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
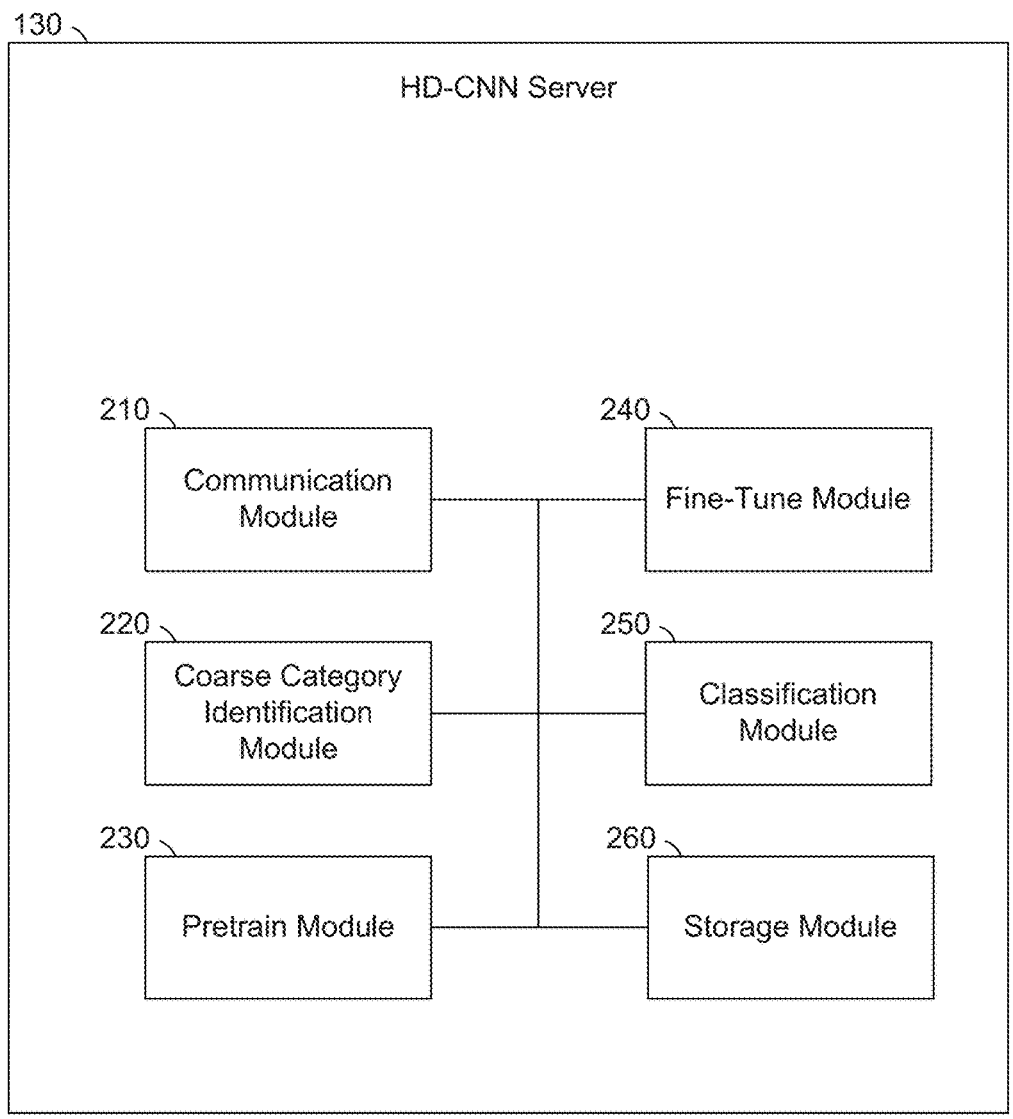
FIG. 2 is a block diagram illustrating components of a hierarchical deep CNN server suitable for image classification, according to some example embodiments.

FIG. 2 is a block diagram illustrating components of the HD-CNN server 130, according to some example embodiments. The HD-CNN server 130 is shown as including a communication module 210, a coarse category identification module 220, a pretrain module 230, a fine-tune module 240, a classification module 250, and a storage module 260 all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 170 and send the received data to the classification module 250. As another example, the classification module 250 may identify a category for an item, and the category for the item may be transmitted by the communication module 210 over the network 170 to the e-commerce server 120.

The coarse category identification module 220 is configured to identify coarse categories for a given dataset. The coarse category identification module 220 determines related fine categories and groups them into coarse categories. For example, a provided dataset may have C fine categories and the HD-CNN designer may determine a number of desired coarse categories, C'. The coarse category identification module 220 identifies the mapping of the C fine categories to the C' coarse categories. Grouping of fine categories into coarse categories may be performed using the process 600 of FIG. 6, described below.

The pretrain module 230 and the fine-tune module 240 are configured to determine the parameters of an HD-CNN. The pretrain module 230 pretrains the coarse category CNN and the fine category CNNs to reduce overlap between the fine category CNNs. The fine-tune module 240 provides additional adjustment to the HD-CNN after pretraining is complete. The pretraining and fine-tuning may be performed using the process 700 of FIG. 7, described below.

The classification module 250 is configured to receive and process image data. The image data may be a two-dimensional image, a frame from a continuous video stream, a three-dimensional image, a depth image, an infrared image, a binocular image, or any suitable combination thereof. For example, an image may be received from a camera. To illustrate, a camera may take a picture and send it to the classification module 250. The classification module 250 determines a fine category for the image by using an HD-CNN (e.g., by determining a coarse category or coarse category weights using a coarse category CNN and determining the fine category using one or more fine category CNNs). The HD-CNN may have been generated using the pretrain module 230, the fine-tune module 240, or both. Alternatively, the HD-CNN may have been provided from an external source.

The storage module 260 is configured to store and retrieve data generated and used by the coarse category identification module 220, the pretrain module 230, the fine-tune module 240, and the classification module 250. For example, the HD-CNN generated by the pretrain module 230 can be stored by the storage module 260 for retrieval by the fine-tune module 240. Information regarding categorization of an image, generated by the classification module 250, can also be stored by the storage module 260. The e-commerce server 120 or 140 can request the category for an image (e.g., by providing an image identifier) which can be retrieved from storage by the storage module 260 and sent over the network 170 using the communication module 210.

Figure 3:
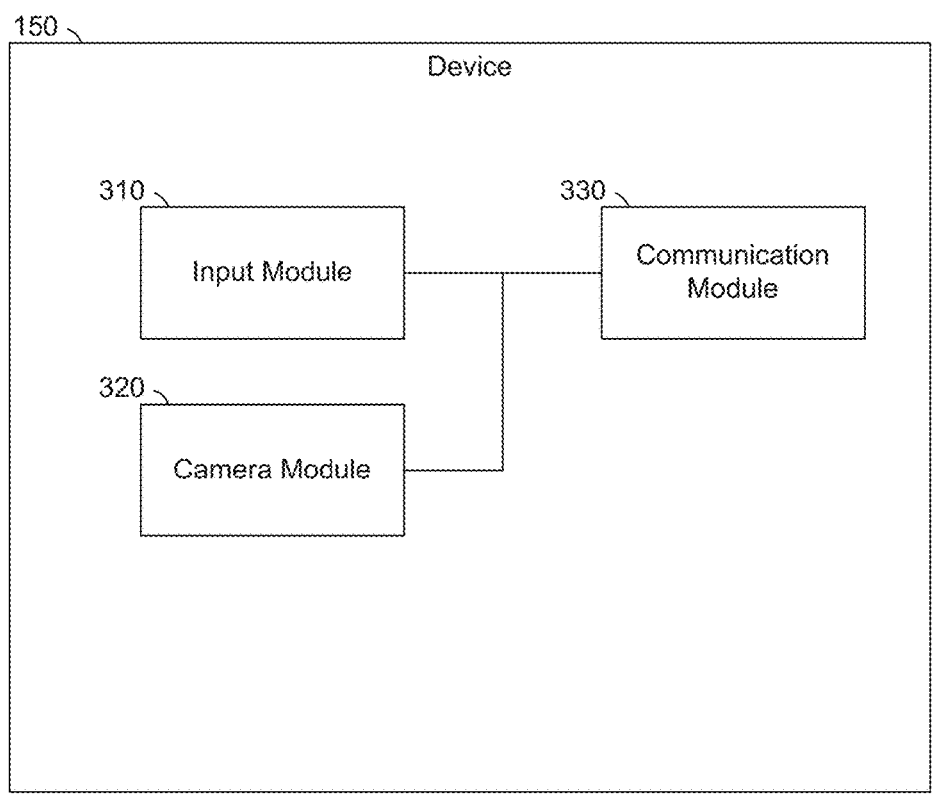
FIG. 3 is a block diagram illustrating components of a device suitable for image classification using hierarchical deep CNN techniques, according to some example embodiments.

FIG. 3 is a block diagram illustrating components of the device 150, according to some example embodiments. The device 150 is shown as including an input module 310, a camera module 320, and a communication module 330, all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 310 is configured to receive input from a user via a user interface. For example, the user may enter their username and password into the input module, configure a camera, select an image to use as a basis for a listing or an item search, or any suitable combination thereof.

The camera module 320 is configured to capture image data. For example, an image may be received from a camera, a depth image may be received from an infrared camera, a pair of images may be received from a binocular camera, and so on.

The communication module 330 is configured to communicate data received by the input module 310 or the camera module 320 to the HD-CNN server 130, the e-commerce server 120, or the e-commerce server 140. For example, the input module 310 may receive a selection of an image taken with the camera module 320 and an indication that the image depicts an item the user (e.g., user 160) wishes to sell. The communication module 330 may transmit the image and the indication to the e-commerce server 120. The e-commerce server 120 may send the image to the HD-CNN server 130 to request classification of the image, generate a listing template based on the category, and cause the listing template to be presented to the user via the communication module 330 and the input module 310.

Figure 4:
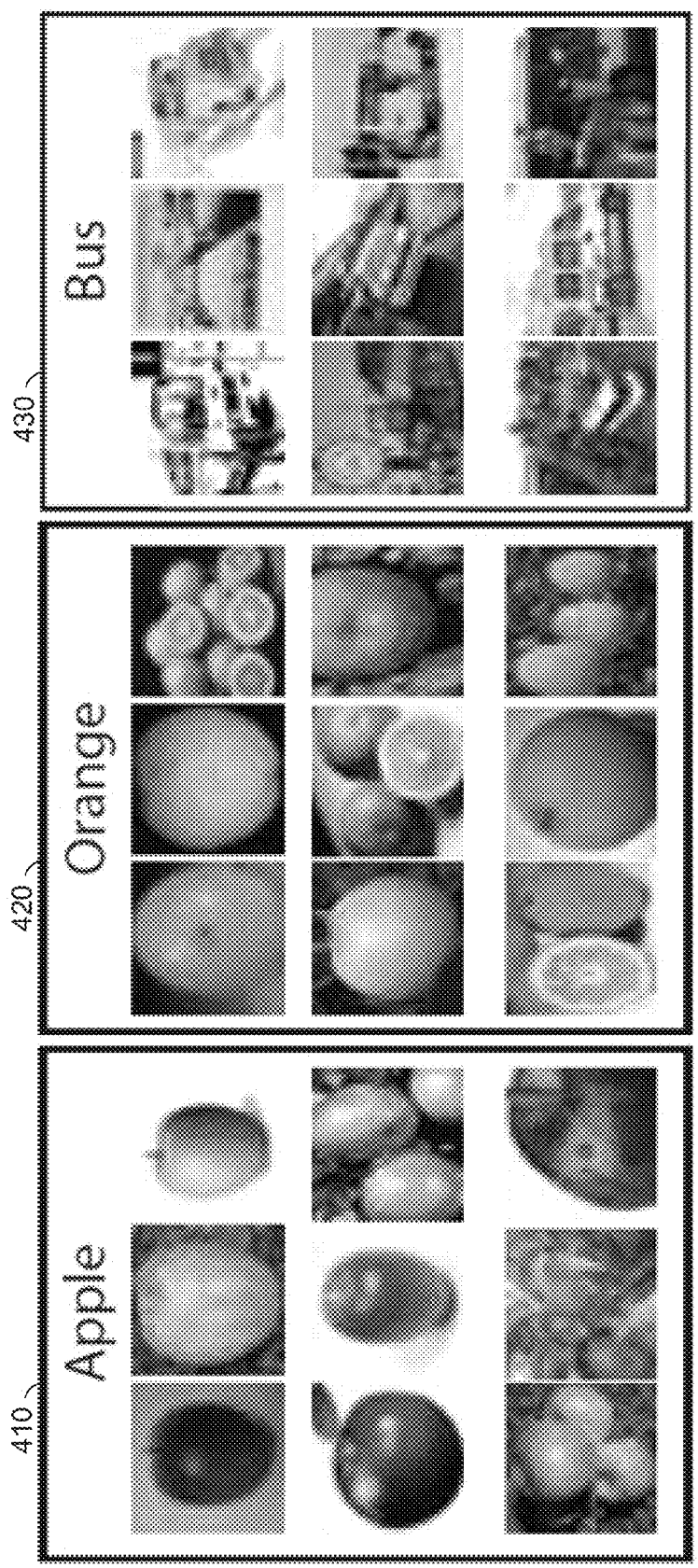
FIG. 4 is a group diagram illustrating categorized images, according to some example embodiments.

FIG. 4 is a group diagram illustrating categorized images, according to some example embodiments. In FIG. 4, twenty-seven images have been correctly classified as depicting an apple (group 410), an orange (group 420), or a bus (group 430). The groups 410-430 are referred to herein as Apple, Orange, and Bus. By inspection, it is relatively easy to tell a member of Apple from a member of Bus, while distinguishing a member of Apple from a member of Orange is more difficult. Images from Apple and Orange can have a similar shape, texture, and color, so correctly telling one from the other is harder. In contrast, images from Bus often have a visual appearance distinct from those in Apple, and classification can be expected to be easier. In fact, both categories, Apple and Orange, can be defined as belonging to the same coarse category while Bus belongs to a different coarse category. For example, in the CIFAR100 dataset (discussed in *Learning Multiple Layers of Features from Tiny Images*, Krizhevsky (2009)), Apple and Orange are subcategories within "fruit and vegetables," and Bus is a subcategory within "vehicles 1." The CIFAR100 dataset consists of 100 classes of natural images. There are 50,000 training images and 10,000 testing images in the CIFAR100 dataset.

Figure 5:
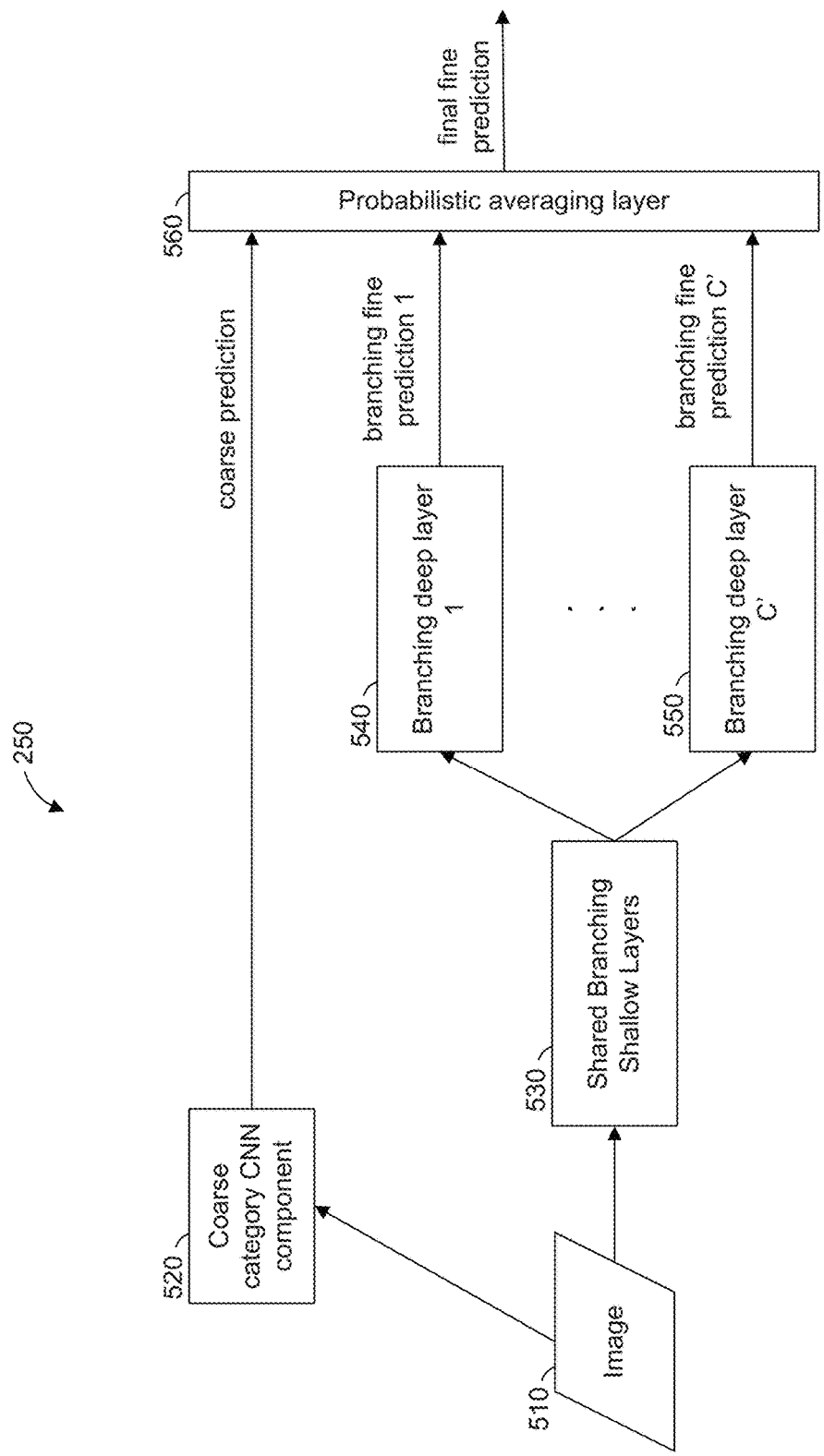
FIG. 5 is a block diagram illustrating relationships between components of a server configured to identify a fine category for an image, according to some example embodiments.

FIG. 5 is a block diagram illustrating relationships between components of the classification module 250, according to some example embodiments. A single standard deep CNN can be used as the building block of the fine prediction components of an HD-CNN. As shown in FIG. 5, a coarse category CNN 520 predicts the probabilities over coarse categories. Multiple branching CNNs 540-550 are independently added. In some example embodiments, branching CNNs 540-550 share the branching shallow layers 530. The coarse category CNN 520 and the multiple branching CNNs 540-550 each receive the input image and operate on it in parallel. Although each branching CNN 540-550 receives the input image and gives a probability distribution over the full set of fine categories, the result of each branching CNN 540-550 is only valid for a subset of categories. The multiple full predictions from branching CNNs 540-550 are linearly combined by the probabilistic averaging layer 560 to form the final fine category prediction, weighted by the corresponding coarse category probabilities.

The following notations are used for the discussion below. A dataset comprises $N_t$ training samples $\{x_i, y_i\}^t$, for i in the range of 1 to $N_t$ and $N_s$ testing samples $\{x_i, y_i\}^t$, for i in the range of 1 to $N_s$. $x_i$ and $y_i$ denote the image data and image label, respectively. The image label corresponds to the fine category of the image. There are C predefined fine categories in the dataset $\{S_k\}$, for k in the range of 1 to C. There are C' coarse categories in the dataset.

As with the standard deep CNN model, HD-CNN achieves end-to-end classification. While a standard deep CNN model consists simply of a single CNN, HD-CNN mainly comprises three parts, namely a single coarse category component B (corresponding to the coarse category CNN 520), multiple branching fine category components $\{F^j\}$, for j in the range of 1 to C' (corresponding to the branching CNNs 540-550), and a single probabilistic averaging layer (corresponding to the probabilistic averaging layer 560). The single coarse category CNN 520 receives raw image pixel data as input and outputs a probability distribution over coarse categories. The coarse category probabilities are used by the probabilistic averaging layer 560 to assign weights to the full predictions made by the branching CNNs 540-550.

FIG. 5 also shows a set of branching CNNs 540-550, each of which makes a prediction over the full set of fine categories. In some example embodiments, the branching CNNs 540-550 share parameters in shallow layers 530 but have independent deep layers. Shallow layers are the layers of a CNN that are closest to the original inputs while deep layers are the layers closer to the final output. Sharing parameters in shallow layers may provide the following benefits. First, in shallow layers, each CNN may extract primitive low-level features (e.g., blobs, corners) which are useful for classifying all fine categories. Accordingly, the shallow layers may be shared between the branching components even though each branching component is focused on a different set of fine categories. Second, sharing parameters in shallow layers greatly reduces the total number of parameters in the HD-CNN, which may aid in the success of training the HD-CNN model. If each branching fine category component is trained completely independently from the others, the number of free parameters in the HD-CNN will be linearly proportional to the number of coarse categories. An overly large number of parameters in the model will increase the likelihood of overfitting. Third, both the computational cost and memory consumption of the HD-CNN are also reduced by sharing the shallow layers, which is of practical significance to deploy HD-CNN in real applications.

The probabilistic averaging layer 560 receives all branching CNN 540-550 predictions as well as the coarse category CNN 520 prediction and produces a weighted average as the final prediction for image i, $p(x_i)$, as shown by the equation below.

$$p(x_i) = \sum_{j=1}^{C'} B_{ij} p_j(x_i).$$

In this equation, $B_{ij}$ is the probability of coarse category j for image i, as predicted by the coarse category CNN 520. The fine category prediction made by the j-th branching component $F^j$ for the image i is $p_j(x_i)$.

Both the coarse category CNN 520 and the branching CNNs 540-550 can be implemented as any end-to-end deep CNN model, which takes a raw image as input and returns probabilistic prediction over categories as output.

The use of a temporal sparsity penalty term to the multinomial logistic loss function for training the fine category components encourages each branch to focus on a subset of fine categories. A revised loss function that includes this temporal sparsity penalty term is shown by the equation below.

$$E = -\frac{1}{n}\sum_{i=1}^{n} p_{y_i} \log(p_{y_i}) + \frac{\lambda}{2} \sum_{j=1}^{C'} \left(t_j - \frac{1}{n}\sum_{i=1}^{n} B_{ij}\right)^2$$

In this equation, n is the size of the training mini-batch, $y_i$ is the ground truth label for image i, and $\lambda$ is a regularization constant. In some example embodiments, a value of 5 is used for $\lambda$. $B_{ij}$ is the probability of coarse category j for image i, as predicted by the coarse category CNN 520. The target temporal sparsity of branch j is represented as $t_j$.

In conjunction with the initialization of the branches, the temporal sparsity term can ensure that each branching component focuses on classifying a different subset of fine categories and prevent a small number of branches receiving the majority of coarse category probability mass.

Figure 6:
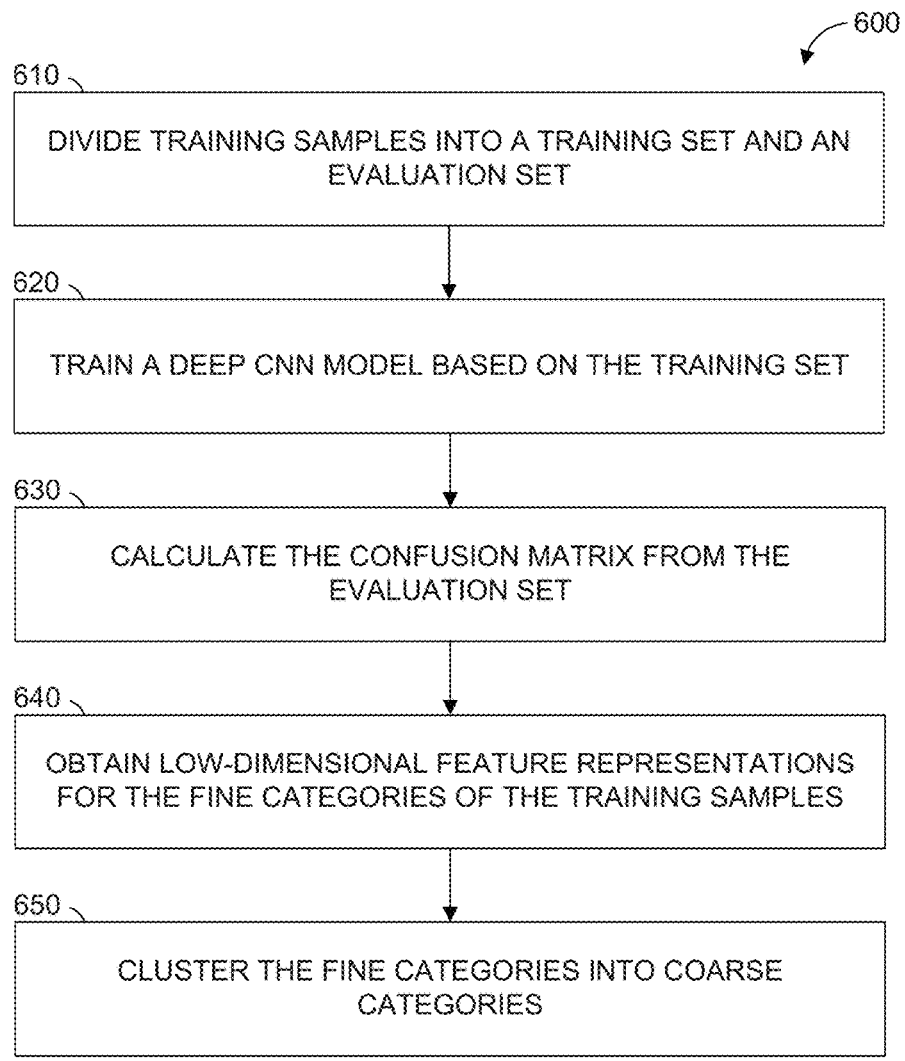
FIG. 6 is a flowchart illustrating operations of a server in performing a process of identifying coarse categories, according to some example embodiments.

FIG. 6 is a flowchart illustrating operations of the HD-CNN server 130 in performing a process 600 of identifying coarse categories, according to some example embodiments. The process 600 includes operations 610, 620, 630, 640, and 650. By way of example only and not limitation, the operations 610-650 are described as being performed by the modules 210-260.

In operation 610, the coarse category identification module 220 divides a set of training samples into a training set and an evaluation set. For example, a dataset consisting of $N_t$ training samples $\{x_i, y_i\}^t$, for i in the range of 1 to $N_t$ is divided into two parts, train_train and train_val. This can be done by selecting a desired distribution of samples between train_train and train_val, such as a 70% to 30% distribution. Once the distribution is chosen, samples may be randomly selected in the proper proportions for each set. A deep CNN model is trained based on train_train in operation 620 by the pretrain module 230 using standard training techniques. For example, the back-propagation training algorithm is one option for training the deep CNN model.

In operation 630, the coarse category identification module 220 plots a confusion matrix based on train_val. The confusion matrix is of size C×C. The columns of the matrix correspond to the predicted fine categories and the rows of the matrix correspond to the actual fine categories in train_val. For example, if every prediction was correct, then only the cells in the main diagonal of the matrix would be non-zero. By contrast, if every prediction were incorrect, then the cells in the main diagonal of the matrix would all be zero.

The coarse category identification module 220 generates a distance matrix, D, by subtracting each element of the confusion matrix from 1 and zeroing the diagonal elements of D. The distance matrix is made symmetric by taking the average of D with $D^T$, the transposition of D. After these operations are performed, each element $D_{ij}$ measures the ease with which category i is distinguished from category j.

In operation 640, low-dimensional feature representations $\{f_i\}$, for i in the range of 1 to C, are obtained for the fine categories. For example, the Laplacian eigenmap may be used for this purpose. The low-dimensional feature representations preserve local neighborhood information on a low-dimensional manifold and are used to cluster fine categories into coarse categories. In example embodiments, the k nearest neighbors are used to construct an adjacency graph. For example, the value of 3 may be used for k. The weights of the adjacency graph are set by using a heat kernel (e.g., with width parameter t=0.95). The dimensionality of $\{f_i\}$ is 3, in some example embodiments.

The coarse category identification module 220 clusters (in operation 650) the C fine categories into C' coarse categories. The clustering may be performed using affinity propagation, k-means clustering, or other clustering algorithms. Affinity propagation can automatically induce the number of coarse categories and may lead to more balanced clusters in size than other clustering methods. Balanced clusters are helpful to ensure each branching component handles a similar number of fine categories and thus has a similar amount of workload. The damping factor $\lambda$ in affinity propagation can affect the number of resulting clusters. In some example embodiments, $\lambda$ is set to 0.98. A result of the clustering is a mapping P(y)=y', from the fine categories y to the coarse categories y'.

For example, the 100 categories of the CIFAR100 dataset can be divided into coarse categories by training a deep CNN model based on the 50,000 training images and 10,000 testing images of the dataset. The number of coarse categories may be provided as an input (e.g., four coarse categories may be selected) and the process 600 used to divide the fine categories into the coarse categories. In an example embodiment, the 100 categories of the CIFAR100 dataset are divided into four coarse categories, as shown in the table below.

| Coarse category | Fine categories |
| --- | --- |
| 1 | bridge, bus, castle, cloud, forest, house, maple tree, mountain, oak tree, palm tree, pickup truck, pine tree, plain, road, sea, skyscraper, streetcar, tank, tractor, train, willow tree |
| 2 | baby, bear, beaver, bee, beetle, boy, butterfly, camel, caterpillar, cattle, chimpanzee, cockroach, crocodile, dinosaur, elephant, fox, girl, hamster, kangaroo, leopard, lion, lizard, man, mouse, mushroom, porcupine, possum, rabbit, raccoon, shrew, skunk, snail, spider, squirrel, tiger, turtle, wolf, woman |
| 3 | bottle, bowl, can, clock, cup, keyboard, lamp, plate, rocket, telephone, television, wardrobe |
| 4 | apple, aquarium fish, bed, bicycle, chair, couch, crab, dolphin, flatfish, lawn mower, lobster, motorcycle, orange, orchid, otter, pear, poppy, ray, rose, seal, shark, snake, sunflower, sweet pepper, table, trout, tulip, whale, worm |

Figure 7:
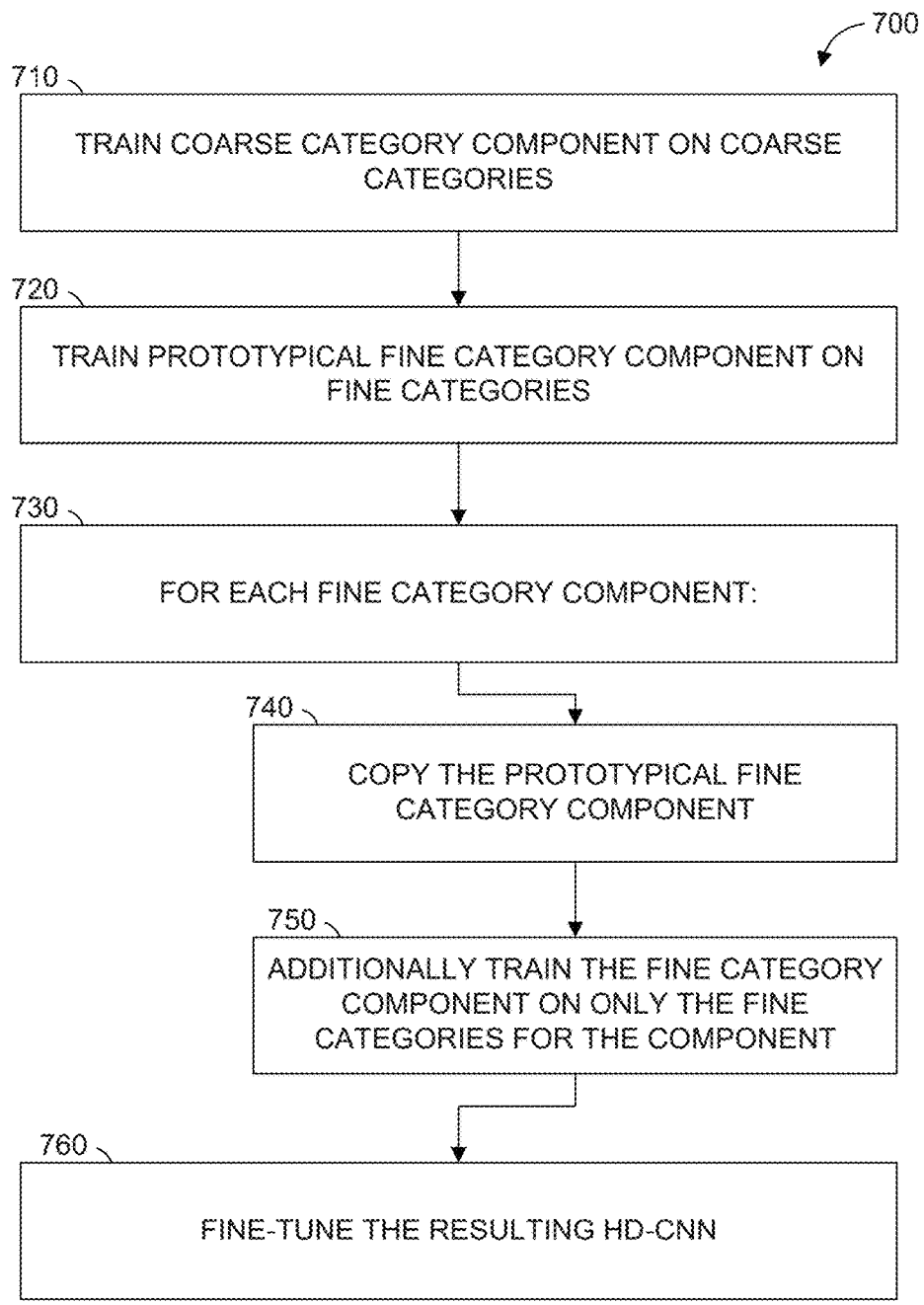
FIG. 7 is a flowchart illustrating operations of a server in performing a process of generating a hierarchical deep CNN for classifying images, according to some example embodiments.

FIG. 7 is a flowchart illustrating operations of the HD-CNN server 130 in performing a process 700 of generating an HD-CNN for classifying images, according to some example embodiments. The process 700 includes operations 710, 720, 730, 740, 750, and 760. By way of example only and not limitation, the operations 710-760 are described as being performed by the modules 210-260.

In operation 710, the pretrain module 230 trains a coarse category CNN on a set of coarse categories. For example, the set of coarse categories may have been identified using the process 600. The fine categories of the training dataset are replaced with the coarse categories using the mapping P(y)=y'. In an example embodiment, the dataset $\{x_i, y'_i\}$, for i in the range of 1 to $N_t$ is used to train a standard deep CNN model. The trained model becomes the coarse category component of the HD-CNN (e.g., the coarse category CNN 520).

In an example embodiment, a network consisting of three convolutional layers, one fully-connected layer, and one SOFTMAX layer is used. There are 64 filters in each convolutional layer. Rectified linear units (ReLU) are used as the activation units. Pooling layers and response normalization layers are also used between convolutional layers. The complete example architecture is defined in the Example 1 table below. Another example architecture is defined in the Example 2 table below.

| Example 1 | | |
| --- | --- | --- |
| Layer name | Layer spec | Activation |
| conv1 | 64 5 × 5 filters | |
| pool1 | 3 × 3 MAX | ReLU |
| norm1 | | |
| conv2 | 64 5 × 5 filters | ReLU |
| pool2 | 3 × 3 AVG | |
| norm2 | | |
| conv3 | 64 5 × 5 filters | ReLU |
| pool3 | 3 × 3 AVG | |
| ip1 | fully-connected | |
| prob | SOFTMAX | |

| Example 2 | | |
| --- | --- | --- |
| Layer name | Layer spec | Activation |
| conv1 | 192 5 × 5 filters | |
| cccp1 | 160 1 × 1 filters | ReLU |
| cccp2 | 96 1 × 1 filters | ReLU |
| pool1 | 3 × 3 MAX | |
| conv2 | 192 5 × 5 filters | |
| cccp3 | 192 1 × 1 filters | ReLU |
| cccp4 | 3 × 3 MAX | ReLU |
| pool2 | 192 3 × 3 filters | |
| conv3 | 192 3 × 3 filters | |
| cccp5 | 192 1 × 1 filters | ReLU |
| cccp6 | 100 1 × 1 filters | ReLU |
| pool3 | 6 × 6 AVG | |
| prob | SOFTMAX | |

In the tables above, the filters use a number of inputs (e.g., pixel values) as indicated. For example, a 5×5 filter looks at 25 pixels in a 5×5 grid to determine a single value. The 5×5 filter considers each 5×5 grid in the input image. Thus, a layer having 64 5×5 filters generates 64 outputs for each input pixel, each of those values being based on the 5×5 grid of pixels centered on that input pixel. A MAX pool takes in a number of inputs for a set of pixels and provides a single output, the maximum of those inputs. For example, a 3×3 MAX pool layer would output one value for each 3×3 block of pixels, the maximum value of those 9 pixels. An AVG pool takes in a number of inputs for a set of pixels and provides a single output, the average (e.g., the mean) of those inputs. A normalization layer normalizes the values output from the previous layer. A cccp layer provides a non-linear component to the CNN. The SOFTMAX function is a normalized exponential function that provides a non-linear variant of multinomial logistic regression. In some example embodiments, the SOFTMAX function takes a K-dimensional vector of values and outputs a K-dimensional vector of values, such that the elements of the output vector sum to 1 and are in the range of 0 to 1. For example, the equation below can be used to generate an output vector y from an input vector z:

$$y_j = \frac{e^{z_j}}{\sum_{k=1}^{K} e^{z_k}} \text{ for } j = 1, \ldots, K.$$

The pretrain module 230 also trains, in operation 720, a prototypical fine category component. For example, the dataset $\{x_i, y_i\}$, for i in the range of 1 to $N_t$ is used to train a standard deep CNN model, which becomes the prototypical fine category component. In an example embodiment, the CIFAR100 dataset is used to train a CNN as the prototypical fine category component.

In operation 730, a loop is begun to process each of the C' fine category components. Accordingly, the operations 740 and 750 are performed for each fine category component. For example, when four coarse categories are identified, the loop will iterate over each of four fine category components.

The pretrain module 230 makes a copy of the prototypical fine category component for the fine category component, in operation 740. Thus, all fine category components are initialized into the same state. The fine category component is further trained on the portion of the dataset corresponding to the coarse category of the fine category component. For example, the subset of the dataset $\{x_i, y_i\}$ where $P(y_i)$ is the coarse category may be used. Once all fine category components and the coarse category component have been trained, the HD-CNN is constructed.

The shallow layers of the CNN for the fine category component may be kept fixed while the deep layers are allowed to change during training. For example, using the Example 1 structure discussed above, the shallow layers conv1, pool1, and norm1 may be kept the same for each fine category component while the deep layers conv2, pool2, norm2, conv3, pool3, ip1, and prob are modified during training of each fine category component. In some example embodiments, the structures of the shallow layers are kept fixed, but the values used within the shallow layers are allowed to change. With respect to the Example 2 structure discussed above, the shallow layers conv1, cccp1, cccp2, pool1, and conv2 may be kept the same for each fine category component while the deep layers cccp3, cccp4, pool2, conv3, cccp5, cccp6, pool3, and prob are modified during training of each fine category component.

In operation 760, the fine-tune module 240 fine-tunes the constructed HD-CNN. The fine-tuning may be performed using the multinomial logistic loss function with the temporal sparsity penalty. The target temporal sparsity $\{t_j\}$, for j in the range of 1 to C', can be defined using the mapping P. For example, the equation below can be used, where $S_k$ is the set of images from fine category k.

$$t_j = \frac{\sum_{k|P(k)=j} |S_k|}{\sum_{k=1}^{C} |S_k|}$$

The batch size for fine-tuning may be selected based on computational time and the desired amount of learning per iteration. For example, a batch size of 250 can be used. After each batch, the training error can be measured. If the rate of improvement of the training error falls below a threshold, the learning rate can be reduced (e.g., by 10%, by a factor of 2, or by another amount). The threshold can be modified when the learning rate is reduced. After a minimum learning rate is reached (e.g., when the learning rate is reduced below 50% of the original value), after a predetermined number of batches have been used for fine-tuning, or any suitable combination thereof, the fine-tuning process is stopped.

According to various example embodiments, one or more of the methodologies described herein may facilitate generating an HD-CNN for image classification. Moreover, one or more of the methodologies described herein may facilitate classifying an image with a higher success rate relative to a standard deep CNN. Furthermore, one or more of the methodologies described herein may facilitate the training of an HD-CNN for the user more quickly and with a lower use of computational power compared to previous methods. Similarly, one or more of the methodologies described herein may facilitate the training of an HD-CNN at a resolution quality with fewer training examples than training a CNN to the same resolution quality.

When these effects are considered in aggregate, one or more of the methodologies described herein may obviate a need for certain efforts or resources that otherwise would be involved in generating or using an HD-CNN for image classification. Efforts expended by a user in ordering items of interest may also be reduced by one or more of the methodologies described herein. For example, accurately identifying a category of an item of interest for a user from an image may reduce the amount of time or effort expended by the user in creating an item listing or finding an item to purchase. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Software Architecture

Figure 8:
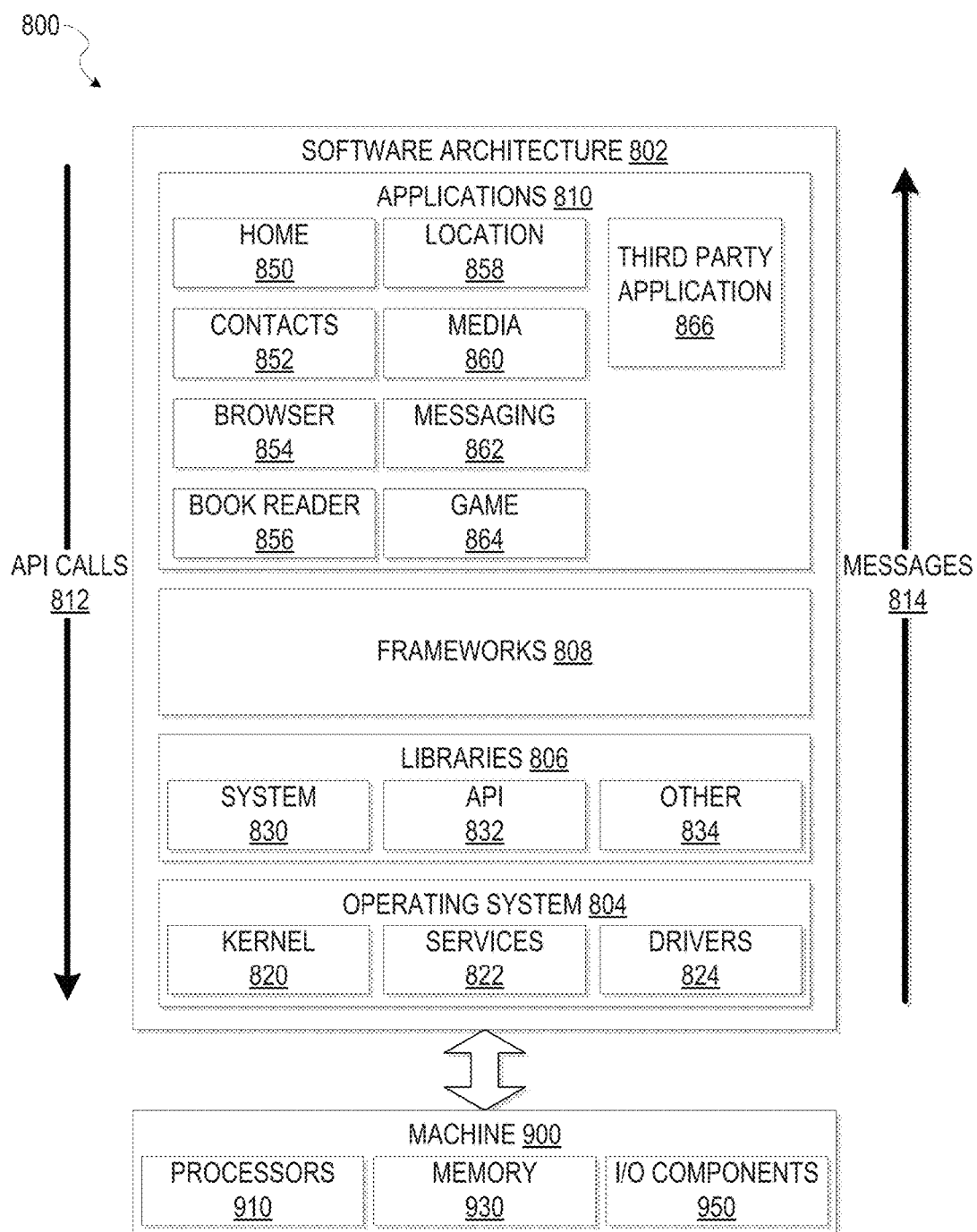
FIG. 8 is a block diagram illustrating an example of a software architecture that may be installed on a machine, according to some example embodiments.

FIG. 8 is a block diagram 800 illustrating an architecture of software 802, which may be installed on any one or more of the devices described above. FIG. 8 is merely a non-limiting example of a software architecture, and it will be appreciated that many other architectures may be implemented to facilitate the functionality described herein. The software 802 may be implemented by hardware such as machine 900 of FIG. 9 that includes processors 910, memory 930, and I/O components 950. In this example architecture, the software 802 may be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, according to some implementations.

In various implementations, the operating system 804 manages hardware resources and provides common services. The operating system 804 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 806 provide a low-level common infrastructure that may be utilized by the applications 810. The libraries 806 may include system libraries 830 (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 may also include a wide variety of other libraries 834 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as third party application 866. According to some embodiments, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 812 provided by the mobile operating system 804 to facilitate functionality described herein.

Example Machine Architecture and Machine-Readable Medium

Figure 9:
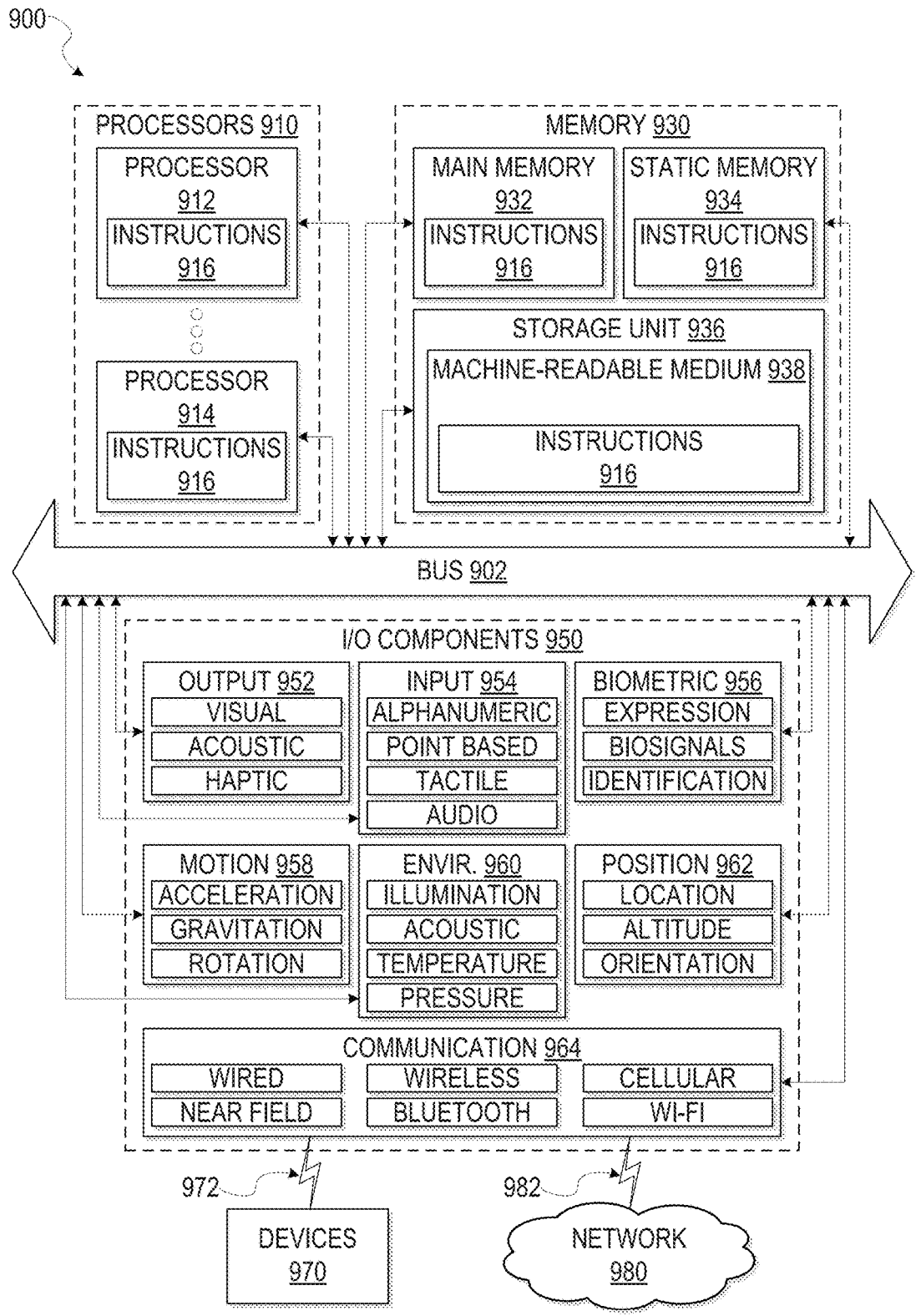
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processors that may comprise two or more independent processors (also referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory 930 may include a main memory 932, a static memory 934, and a storage unit 936 accessible to the processors 910 via the bus 902. The storage unit 936 may include a machine-readable medium 938 on which is stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, in various implementations, the main memory 932, static memory 934, and the processors 910 are considered as machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962 among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 962 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 include a network interface component or another suitable device to interface with the network 980. In further examples, communication components 964 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, in some implementations, the communication components 964 detect identifiers or include components operable to detect identifiers. For example, the communication components 964 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a memory that stores instructions; and
one or more processors configured by the instructions to perform operations comprising:
accessing a dataset comprising categorized data having a plurality of fine categories;
dividing the dataset into a training set and a value set;
training a first convolutional neural network (CNN) model using the training set;
generating a confusion matrix of the first CNN model using the value set;
applying a clustering algorithm to the confusion matrix to determine, for each fine category, an associated coarse category of a plurality of coarse categories, each coarse category being associated with more than one fine category;
training a base CNN to distinguish between the coarse categories;
training a single fine CNN for each coarse category, the single fine CNN for said coarse category to distinguish between the fine categories associated with said coarse category;
receiving a request to classify data;
using the base CNN, determining a coarse category of the data;
using the single fine CNN for the determined coarse category, determining a single fine category of the data; and
responsive to the request, transmitting the single fine category of the data.

2. The system of claim 1, wherein the clustering algorithm comprises an affinity propagation algorithm.

3. The system of claim 2, wherein the operations further comprise:
obtaining low-dimensional feature representations for the fine categories using a Laplacian eigenmap.

4. The system of claim 2, wherein the training of the fine CNN for each coarse category comprises:
training a second CNN model using the training set;
generating the fine CNN for each coarse category from the second CNN; and
training the fine CNN for each coarse category using a subset of the training set, the subset excluding data having fine categories not associated with said coarse category.

5. The system of claim 1, wherein the operations further comprise:
combining the base CNN with each of the fine CNNs to form a hierarchically deep CNN (HD-CNN); and
fine-tuning the HD-CNN.

6. The system of claim 5, wherein the fine-tuning of the HD-CNN comprises:
beginning the fine-tuning with a learning factor;
training the HD-CNN by iterating over a series of training batches using the learning factor;
after each iteration, comparing a training error for the training batch to a threshold;
determining, based on the comparison, that the training error for the training batch is below the threshold; and
in response to the determination that the training error for the training batch is below the threshold, modifying the learning factor.

7. The system of claim 5, wherein the fine-tuning of the HD-CNN comprises:
applying a temporal sparsity penalty term in evaluating each of the fine CNNs.

8. The system of claim 1, wherein the dataset comprising the categorized data comprises categorized images.

9. A method comprising:
accessing, by one or more processors, a dataset comprising categorized data having a plurality of fine categories;
dividing, by the one or more processors, the dataset into a training set and a value set;
training, by the one or more processors, a first CNN model using the training set;
generating, by the one or more processors, a confusion matrix of the first CNN model using the value set;
applying, by the one or more processors, a clustering algorithm to the confusion matrix to determine, for each fine category, an associated coarse category of a plurality of coarse categories, each coarse category being associated with more than one fine category;
training, by the one or more processors, a base convolutional neural network (CNN) to distinguish between the coarse categories, the base CNN implemented by a processor of a machine;
training, by the one or more processors, a single fine CNN for each coarse category, the single fine CNN for said coarse category to distinguish between the fine categories associated with said coarse category;
receiving, by the one or more processors, a request to classify data;
using the base CNN, determining, by the one or more processors, a coarse category of the data;
using the single fine CNN for the determined coarse category, determining, by the one or more processors, a single fine category of the data; and
responsive to the request, transmitting, by the one or more processors, the single fine category of the data.

10. The method of claim 9, wherein the clustering algorithm comprises an affinity propagation algorithm.

11. The method of claim 10, further comprising obtaining low-dimensional feature representations for the fine categories using a Laplacian eigenmap.

12. The method of claim 10, wherein the training of the fine CNN for each coarse category comprises:
training a second CNN model using the training set;
generating the fine CNN for each coarse category from the second CNN; and
training the fine CNN for each coarse category using a subset of the training set, the subset excluding data having fine categories not associated with said coarse category.

13. The method of claim 9, further comprising:
combining the base CNN with each of the fine CNNs to form a hierarchically deep CNN (HD-CNN); and
fine-tuning the HD-CNN.

14. The method of claim 13, wherein the fine-tuning of the HD-CNN includes:
beginning the fine-tuning with a learning factor;
training the HD-CNN by iterating over a series of training batches using the learning factor;
after each iteration, comparing a training error for the training batch to a threshold;
determining, based on the comparison, that the training error for the training batch is below the threshold; and
in response to the determination that the training error for the training batch is below the threshold, modifying the learning factor.

15. The method of claim 13, wherein the fine-tuning of the HD-CNN includes:
applying a temporal sparsity penalty term in evaluating each of the fine CNNs.

16. The system of claim 1, wherein:
the using of the base CNN to determine the coarse category of the data comprises:
providing an input to the base CNN; and
receiving a first output from the base CNN; and
the using of the fine CNN for the determined coarse category to determine the single fine category of the data comprises:
providing the input to the fine CNN; and
receiving a second output from the fine CNN.

17. The system of claim 1, wherein:
the receiving of the request to classify data comprises receiving, from a computing device via a network, an image; and
the operations further comprise:
generating a listing template based on the single fine category; and
causing the listing template to be presented on the computing device.

18. A non-transitory machine-readable medium having instructions embodied thereon, the instructions executable by a processor of a machine to perform operations comprising:
accessing a dataset comprising categorized data having a plurality of fine categories;
dividing the dataset into a training set and a value set;
training a first CNN model using the training set;
generating a confusion matrix of the first CNN model using the value set;
applying a clustering algorithm to the confusion matrix to determine, for each fine category, an associated coarse category of a plurality of coarse categories, each coarse category being associated with more than one fine category;
training a base convolutional neural network (CNN) to distinguish between the coarse categories, the CNN implemented by a processor of a machine;
training a single fine CNN for each coarse category, the single fine CNN for said coarse category to distinguish between the fine categories associated with said coarse category;
receiving a request to classify data;

using the base CNN, determining a coarse category of the data;

using the single fine CNN for the determined coarse category, determining a single fine category of the data; and responsive to the request, transmitting the single fine category of the data.

19. The non-transitory machine-readable medium of claim 18, wherein the clustering algorithm comprises an affinity propagation algorithm.

20. The non-transitory machine-readable medium of claim 19, wherein the training of the fine CNN for each coarse category comprises:

training a second CNN model using the training set;

generating the fine CNN for each coarse category from the second CNN model; and training the fine CNN for each coarse category using a subset of the training set, the subset excluding data having fine categories not associated with said coarse category.

* * * * *